"(12) United States Patent
Rhyne et al.

(10) Patent No.: US 11,167,593 B2
(45) Date of Patent: *Nov. 9, 2021

(54) REINFORCEMENT STRUCTURE FOR NON-PNEUMATIC WHEEL

(71) Applicants: Compagnie Generale des Etablissements Michelin, Clermont-Ferrand (FR); Timothy Rhyne, Greenville, SC (US); Steve Cron, Simpsonville, SC (US); Antonio Delfino, Givisiez (CH)

(72) Inventors: Timothy Rhyne, Greenville, SC (US); Steve Cron, Simpsonville, SC (US); Antonio Delfino, Givisiez (CH)

(73) Assignee: COMPAGNIE GENERALE DES ESTABLISSEMENTS MICHELIN, Clermont-Ferrand (FR)

( * ) Notice: Subject to any disclaimer, the term of this patent is extended or adjusted under 35 U.S.C. 154(b) by 504 days.

This patent is subject to a terminal disclaimer.

(21) Appl. No.: 16/063,839

(22) PCT Filed: Nov. 15, 2016

(86) PCT No.: PCT/US2016/062043
§ 371 (c)(1),
(2) Date: Jun. 19, 2018

(87) PCT Pub. No.: WO2017/112130
PCT Pub. Date: Jun. 29, 2017

(65) Prior Publication Data
US 2019/0001749 A1 Jan. 3, 2019

Related U.S. Application Data

(63) Continuation of application No. PCT/US2015/067371, filed on Dec. 22, 2015.

(51) Int. Cl.
B60C 7/18 (2006.01)
B60C 7/22 (2006.01)

(52) U.S. Cl.
CPC . B60C 7/18 (2013.01); B60C 7/22 (2013.01)

(58) Field of Classification Search
CPC .... B60C 7/00; B60C 7/10; B60C 7/18; B60B 9/00; B60B 9/10; B60B 9/12; B60B 9/26
See application file for complete search history.

(56) References Cited

U.S. PATENT DOCUMENTS 711,081 A 10/1902 Stevens
1,665,558 A 4/1928 Montgomery
(Continued)

FOREIGN PATENT DOCUMENTS

CN 203157578 U 8/2013
DE 29608495 U1 8/1996
(Continued)

OTHER PUBLICATIONS

International Search Report for PCT/US2016/062043 dated Feb. 2, 2017.
(Continued)

Primary Examiner — Jason R Bellinger
(74) Attorney, Agent, or Firm — Dority & Manning, P.A.

(57) ABSTRACT

A non-pneumatic wheel having an annular reinforcement structure that includes rectangular reinforcements within a shear layer. The rectangular reinforcements replace deforming rubber or polymeric materials and can thereby reduce the volume of deforming materials to optimize energy loss therein and reduce rolling resistance of the non-pneumatic wheel.

15 Claims, 5 Drawing Sheets

(56) References Cited

U.S. PATENT DOCUMENTS

| | | | |
|---|---|---|---|
| 3,730,244 A | 5/1973 | Ross | |
| 3,973,613 A | 8/1976 | Marzocchi | |
| 4,553,577 A | 11/1985 | Gregg | |
| 4,715,419 A | 12/1987 | Kawasaki | |
| 5,042,544 A | 8/1991 | Dehasse | |
| 5,565,257 A | 10/1996 | Tingley | |
| 6,321,808 B1 | 11/2001 | Spragg | |
| 6,422,279 B1 | 7/2002 | Williams | |
| 7,363,805 B2 | 4/2008 | Jayakumar | |
| 7,418,988 B2 | 9/2008 | Cron | |
| 2007/0267116 A1 | 11/2007 | Rhyne | |
| 2008/0250843 A1 | 10/2008 | Albohr | |
| 2008/0265659 A1 | 10/2008 | Heyse | |
| 2010/0193097 A1 | 8/2010 | Mcnier | |
| 2011/0030866 A1* | 2/2011 | Fadel | B60C 7/18 152/311 |
| 2014/0083581 A1 | 3/2014 | Schaedler et al. | |
| 2017/0174003 A1* | 6/2017 | Benzing, II | B60C 7/102 |
| 2019/0283504 A1* | 9/2019 | Murata | B60C 5/01 |
| 2019/0344621 A1* | 11/2019 | Gaylo | B60C 11/00 |
| 2020/0139764 A1* | 5/2020 | Merino Lopez | B60B 5/02 |
| 2020/0316998 A1* | 10/2020 | Rhyne | B60C 7/102 |

FOREIGN PATENT DOCUMENTS

| | | |
|---|---|---|
| DE | 19538082 A1 | 4/1997 |
| FR | 334354 A | 12/1903 |
| FR | 348847 A | 4/1905 |
| FR | 1164324 A | 10/1958 |
| FR | 1604616 A | 1/1972 |
| FR | 2566335 | 12/1985 |
| GB | 165662 A | 6/1920 |
| JP | 2006117130 A | 10/2004 |
| JP | 2011183894 A | 3/2010 |
| JP | 2015151009 A | 2/2014 |
| WO | 2009005946 A | 8/2009 |
| WO | 2010007636 A1 | 1/2010 |
| WO | 2011046553 A1 | 4/2011 |
| WO | WO2013/095499 | 6/2013 |

OTHER PUBLICATIONS

International Search Rerrt for PCT/US2015/067371 dated Aug. 22, 2016.

European Patent Office; International Search Report and Written Opinion for patent application PCT/US2016/069440; dated Oct. 19, 2017; Publisher: European Patent Office, Rijswijk, Netherlands, pp. 1-10, attached.

European Patent Office; International Search Report and Written Opinion for patent application PCT/US2017/068990; dated May 7, 2018; Publisher: European Patent Office, Rijswijk, Netherlands, pp. 1-11, attached.

* cited by examiner

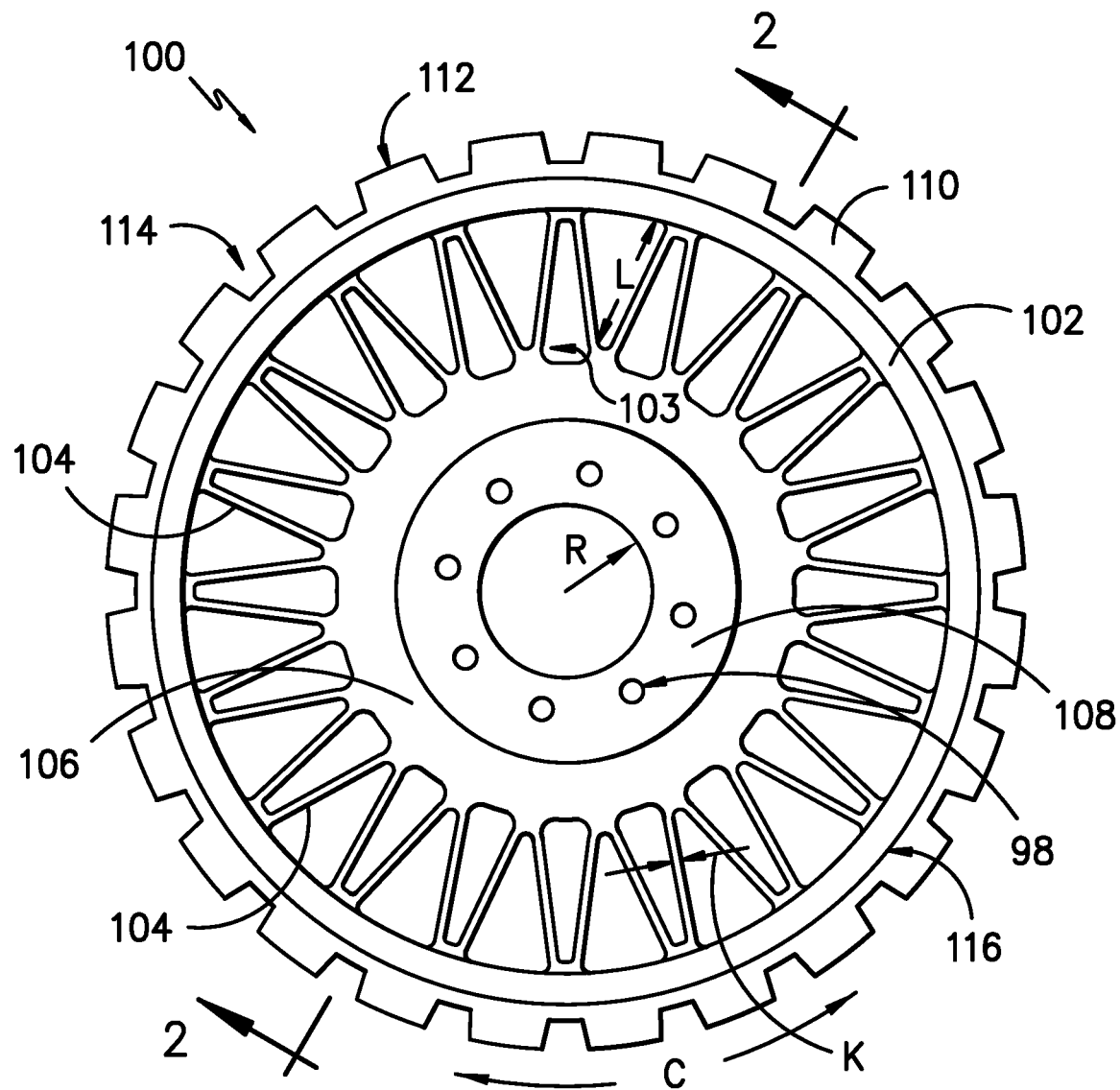
FIG. -1-

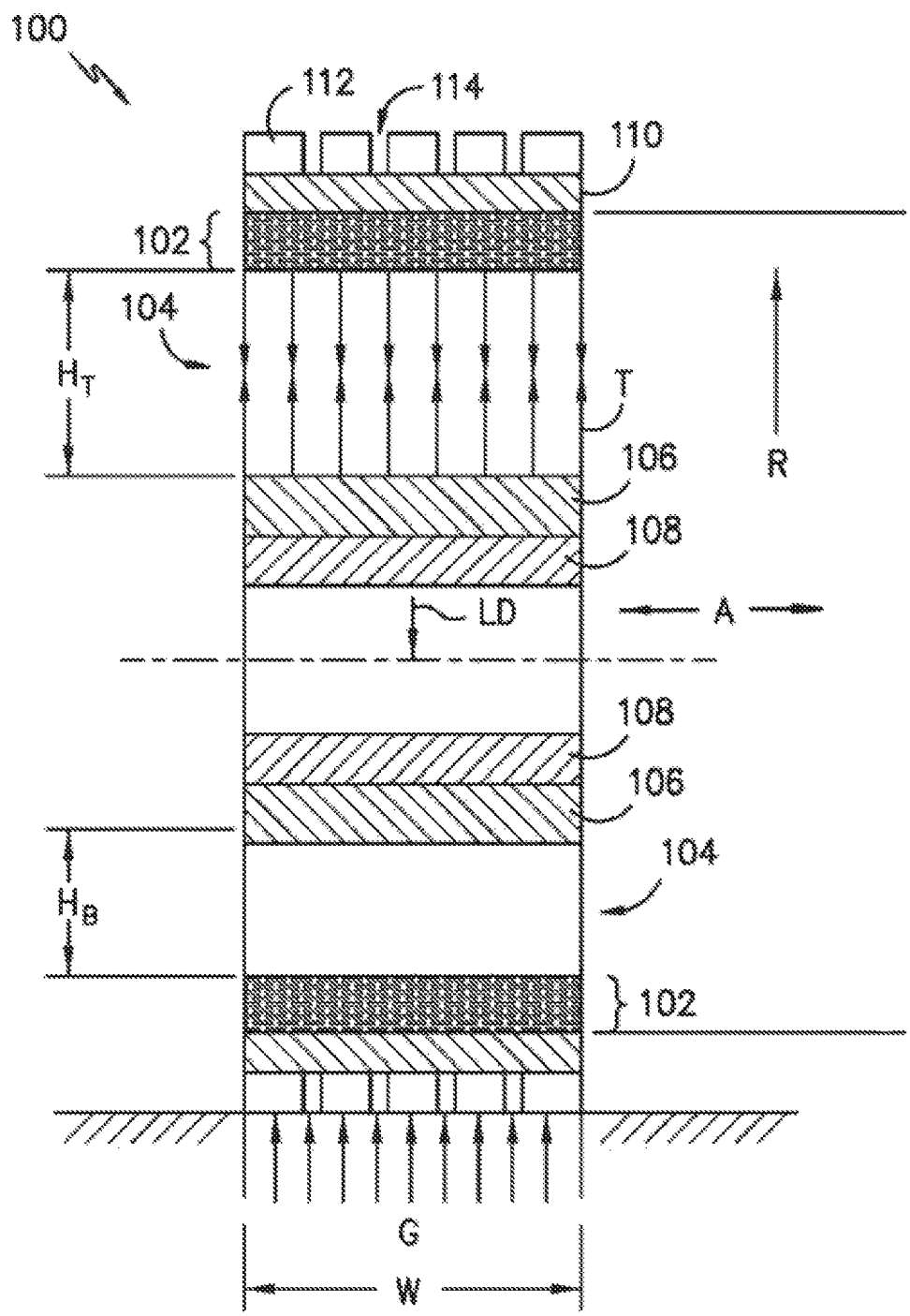
FIG. -2-

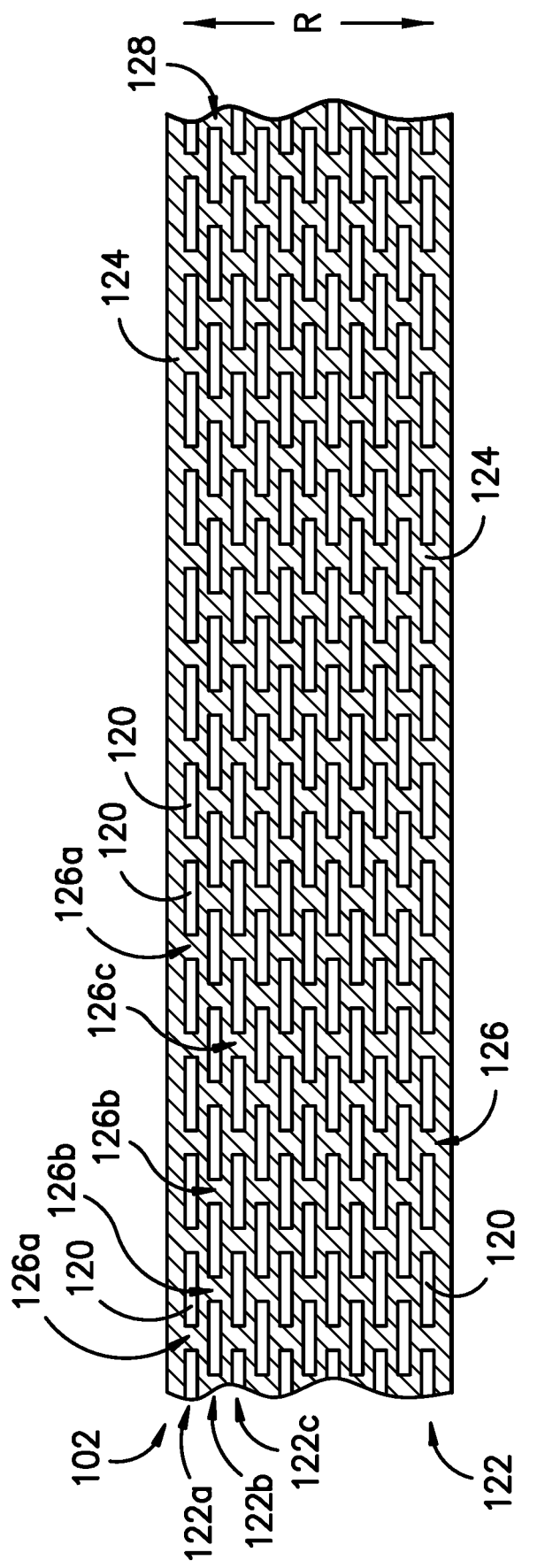
FIG. -3-

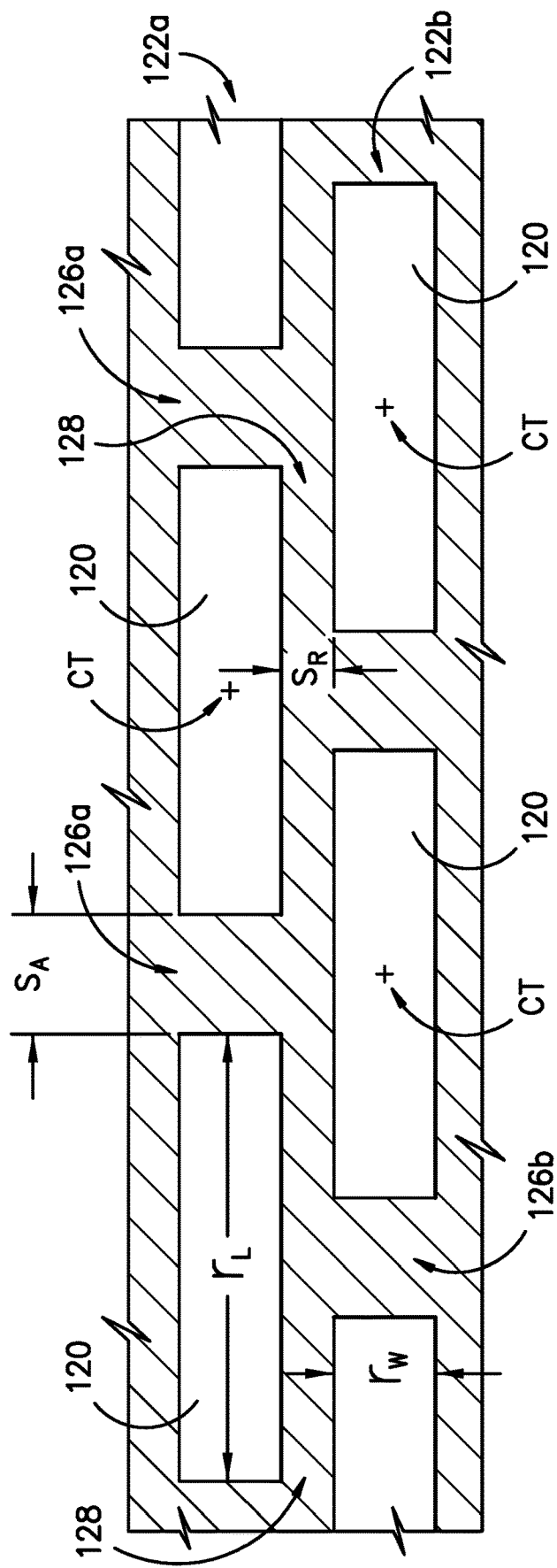
FIG. -4-

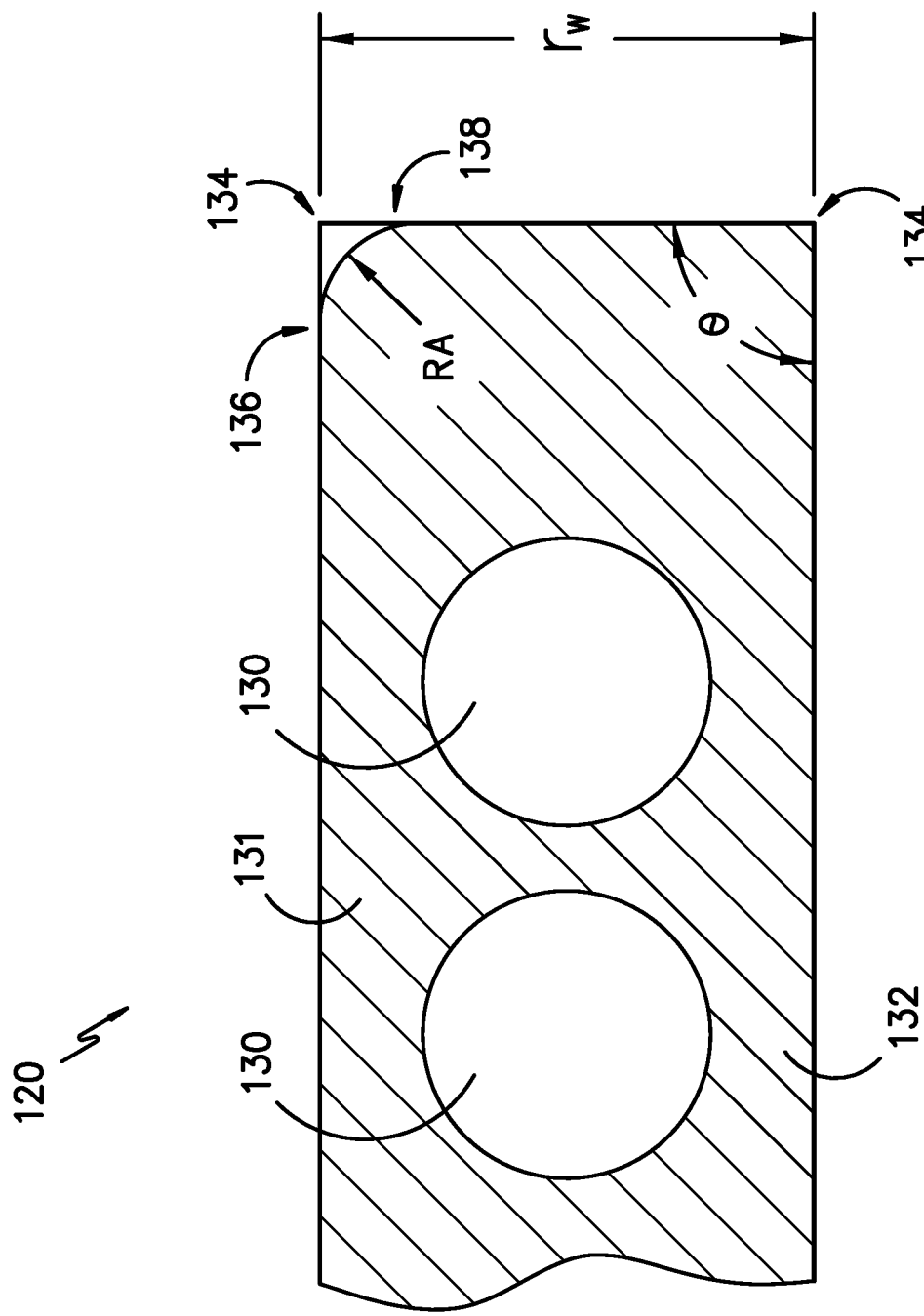
FIG. -5-

REINFORCEMENT STRUCTURE FOR NON-PNEUMATIC WHEEL

PRIORITY STATEMENT

The present application claims priority under 35 U.S.C. § 119 to PCT/US15/067371, filed Dec. 22, 2015.

FIELD OF THE INVENTION

The subject matter of the present disclosure relates to an improved reinforcement structure for a non-pneumatic wheel.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire wheel constructions provide certain such improvements. The details and benefits of non-pneumatic tire or non-pneumatic wheel constructions are described e.g., in U.S. Pat. Nos. 6,769,465; 6,994,134; 7,013,939; and 7,201,194. Certain non-pneumatic tire and wheel constructions propose incorporating a shear band, embodiments of which are described in e.g., U.S. Pat. Nos. 6,769,465 and 7,201,194, which are incorporated herein by reference. Such non-pneumatic tire and wheel constructions provide advantages in performance without relying upon a gas inflation pressure for support of the loads applied to the tire or wheel.

For example, U.S. Pat. No. 6,769,465 relates to a structurally supported resilient tire that supports a load without internal air pressure. In an exemplary embodiment, this non-pneumatic tire includes a ground contacting portion and side wall portions that extend radially inward from the tread portion and anchor in bead portions that are adapted to remain secure to a wheel during rolling of the tire. A reinforced annular band is disposed radially inward of the tread portion. This shear band includes at least one homogenous shear layer, a first membrane adhered to the radially inward extent of the shear layer and a second membrane adhered to the radially outward extent of the shear layer. Each of the membranes has a longitudinal tensile modulus sufficiently greater than the dynamic shear modulus of the shear layer so that, when under load, the ground contacting portion of the tire deforms to a flat contact region through shear strain in the shear layer while maintaining constant length of the membranes. Relative displacement of the membranes occurs substantially by shear strain in the shear layer. The invention of U.S. Pat. No. 6,769,465 provides several advantages including, for example, the ability to operate without an inflation pressure and the flexibility to adjust the vertical stiffness of the tire somewhat independently of the ground contact pressure.

In contrast, conventional solid tires, spring tires, and cushion tires, although lacking the need for maintenance, air pressure, or the susceptibility to damage of pneumatic tires, unfortunately lack its performance advantages. In particular, solid and cushion tires typically include a solid rim surrounded by a resilient material layer. These tires rely on compression of the ground-contacting portion of the resilient layer directly under the load for load support. These types of tires can be heavy and stiff and lack the shock absorbing capability of pneumatic tires. Spring tires typically have a rigid wood, metal, or plastic ring with springs or spring like elements connecting it to a hub. While the hub is thereby suspended by the springs, the inflexible ring has only a small contact area with the road, which offers essentially no compliance, and provides poor traction and steering control.

With both pneumatic and non-pneumatic tires or wheels, it is desirable to improve their fuel efficiency. Such an improvement can be achieved by e.g., reductions in the overall size or mass and/or using lower energy loss materials so as to lower the rolling resistance. For non-pneumatic tires or wheels employing a shear band having a homogenous shear layer, challenges are encountered in making such reductions. For example, the use of materials for the shear layer that have low energy dissipation can lead to an unacceptable, offsetting increase in the mass of the material required due to typically lower shear modulus of these materials. Non-pneumatic tires or wheels employing a shear band with reinforcements can improve on energy dissipation but improvements in rolling resistance are still needed.

Accordingly, a non-pneumatic wheel construction having an improved rolling resistance performance would be useful. Such a wheel that can also provide other performance advantages associated with non-pneumatic constructions as described above would be also be beneficial.

SUMMARY OF THE INVENTION

The present invention provides a non-pneumatic wheel having an annular reinforcement structure that includes rectangular reinforcements positioned within a shear layer. The rectangular reinforcements replace deforming rubber or polymeric materials and can thereby reduce the volume of deforming materials to optimize energy loss therein and reduce rolling resistance of the non-pneumatic wheel. Additional objects and advantages that may be realized by the invention will be set forth in part in the following description, or may be apparent from the description, or may be learned through practice of the invention.

In one exemplary embodiment, the present invention provides a non-pneumatic wheel defining axial, radial, and circumferential directions. The non-pneumatic wheel includes an annular shear layer constructed from at least one elastomeric material. A plurality of discrete, annular reinforcing elements are positioned along a plurality of axially-oriented rows located in the annular shear layer. The reinforcing elements are separated from one another by a predetermined distance $S_A$ along the axial direction and $S_R$ in the radial direction. The reinforcing elements having a substantially rectangular cross-section. The reinforcing elements may be interlaced along the radial direction of the shear band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of an exemplary wheel of the present invention.

FIG. 2 illustrates cross-sectional view, taken along a meridian plane at lines 2-2, of the exemplary wheel of FIG. 1.

FIG. 3 provides a cross-sectional view of an exemplary annular shear band or annular reinforcement structure of the present invention as viewed along a meridian plane of the exemplary wheel of FIG. 1.

FIG. 4 provides an enlarged cross-sectional view of the exemplary annular shear band or annular reinforcement structure of FIG. 3.

FIG. 5 provides an enlarged cross-sectional view of a portion of an exemplary reinforcing element of the exemplary shear band of FIG. 3.

The use of the same or similar reference numerals in the figures denotes the same or similar features.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of e.g., the shear band or wheel as it travels along a road surface.

"Radial direction" or the letter "R" in the figures refers to a direction that is orthogonal to axial direction A and extends in the same direction as any radius that extends orthogonally from axial direction A.

"Circumferential direction" or the letter C is orthogonal to both radial direction R and axial direction A at any given point about the circumference of the wheel or shear layer and is defined by the direction of rotation of the wheel about the axis of rotation.

"Equatorial plane" means a plane that passes perpendicular to the axis of rotation and bisects the shear band and/or wheel structure.

"Meridian plane" means a plane that includes the axis of rotation and intersections the shear band and/or wheel structure.

"Interlaced" refers to the manner in which discrete annular reinforcements or reinforcing elements of the shear band may be arranged within the shear layer of certain embodiments, as will be further described with reference to the figures. As used herein, with reference to certain embodiments of the invention, "interlaced" means that the reinforcing elements between adjacent axially-oriented rows are not aligned with each other along radial direction R. Instead, where interlaced, the center of a reinforcing element of one axially-oriented row is positioned substantially adjacent to the space between a pair of reinforcement elements in adjacent, axially-oriented rows. It should be understood, however, that during manufacturing reinforcements are typically wound on the shear band in a spiral, and each layer is wound in the opposite direction to a previous layer. As such, some reinforcing element of the interlaced shear band may be aligned along the radial direction. In addition, as will be understood by one of skill in the art using the teachings disclosed herein, during tire manufacture a perfect positioning of the center of a reinforcing element precisely with space between a pair of reinforcement elements in an adjacent, axially-oriented row may not be possible due to e.g., the movement of materials during the manufacturing process. As such, slight displacements of the reinforcement elements of the configuration can occur.

FIG. 1 provides an exemplary embodiment of a non-pneumatic wheel 100 as may incorporate an annular reinforcement structure or shear band 102 of the present invention. FIG. 2 provides a cross-sectional view of wheel 100 taken along line 2-2 in FIG. 1. Wheel 100, as shown in FIGS. 1 and 2, includes annular shear band 102 and a plurality of tension transmitting elements, illustrated as web spokes 104, extending transversely across the axial direction A, and inward along radial direction R, from shear band 102. At a radially innermost end 103, web spokes 104 connect to a mounting band 106. Mounting band 106 anchors wheel 100 to a hub 108 with holes 98 for mounting onto e.g., an axle assembly of a vehicle. Wheel 100 can be mounted onto hub 108 or can be constructed integrally with hub 108. For example, one or more of spokes 104, band 106, and hub 108 may be integrally molded.

A tread portion 110 is formed at the outer periphery 116 of shear band 102. Tread portion 110 may be an additional rubber layer bonded on the band 102, as shown for example in FIGS. 1 and 2. Tread portion 110 can be used to provide different traction and wear properties than the material used to construct band 102. Alternatively, tread portion 110 may be formed as part of the outer surface of the compliant band 102. In still another alternative, shear band 102 may be enclosed within one or more rubber materials connected with tread portion 110. Tread features may be formed in the tread portion 110 and may include e.g., blocks 112 and grooves 114. Ribs, blocks, and other combinations may be used as well.

As mentioned, web spokes 104 in the exemplary embodiment of FIGS. 1 and 2 extend transversely along axial direction A of wheel 100. More particularly, web spokes 104 extend axially from side to side of wheel 100 and may be aligned with the axis of rotation, or may be oblique to the wheel axis as shown. Although shown as extending the full width W of wheel 100, spokes 104 may have a different width than wheel 100 and may include different shapes from what is shown.

Further, web spokes 104 extend radially inward between shear band 102 and mounting band 106. Web spoke 104 may lie in a plane that includes the axis of rotation of wheel 100 or may be oblique to such radial plane. In addition, as shown in FIG. 2, web spokes 104 may actually include spokes at different angles to the radial plane. Various shapes and patterns may be used as shown, e.g., in U.S. Pat. No. 7,013,939 and WO 2008/118983. Accordingly, as will be understood by one of ordinary skill in the art, the present invention is not limited to the radial spokes 104 shown in the figures as other shapes and orientations may be used as well as a different number of web spokes than is shown.

Annular shear band 102 supports the load LD (FIG. 2) on wheel 100 and resiliently deforms to conform to the road (or other supporting surface) to provide traction, comfort, and handling capabilities. More particularly, as described e.g., in U.S. Pat. No. 7,013,939, when a load LD is placed on the wheel 100 through hub 108, shear band 102 acts compliantly in that it bends and otherwise deforms for ground contact (arrows G in FIG. 2) and forms a contact patch, which is the portion of wheel 100 that is in contact with the ground under such load. The portion of band 102 that is not in ground contact acts in a manner similar to an arch and provides a circumferential compression stiffness and a longitudinal bending stiffness in the equatorial plane sufficiently high to act as a load-supporting member.

The load on the wheel 100 transmitted from the vehicle (not shown) to hub 108 essentially hangs by web spokes 104 (e.g., tensile forces as shown by arrows T in FIG. 2) attached to the load supporting portion of band 102. Web spokes 104 in the ground contacting region do not experience tensile loading due to the load—and, e.g., in certain exemplary embodiments spokes 102 can even buckle under load above the ground contacting region such that radial height $H_T$ of spokes 104 in the region of tension is greater than the radial height $H_B$ of spokes 104 in the region of compression.

As wheel 100 rotates, of course, the specific portion of compliant band 102 acting as an arch continually changes; however, the concept of an arch is useful for understanding the load supporting mechanism. The amount of bending of band 102, and accordingly, the size of the contact patch is proportional to the load. The ability of band 102 to bend resiliently under the load provides a compliant ground contact area that acts similar to that of a pneumatic tire, with similar advantageous results.

Still referring to FIGS. 1 and 2, web spokes 104 are substantially sheet-like elements having a length L (FIG. 1) generally along radial direction R and a width W along axial direction A corresponding generally to the axial width of compliant band 102, although other widths W may be used including widths W that vary along the radial direction R. Web spokes 104 also have a thickness K (i.e. a dimension perpendicular to length L and width W) that is generally much less than either the length L or the width W, which allows a web spoke to buckle or bend when under compression. Thinner web spokes will bend when passing through the contact area with substantially no compressive resistance, that is, supplying no or only insignificant compressive force to load bearing. As the thickness of web spokes 104 is increased, web spokes 104 may provide some compressive load bearing force in the ground contact area. The predominant load transmitting action of web spokes 104 as a whole, however, is in tension (arrows T in FIG. 2). A particular web spoke thickness K may be selected to meet the specific requirements of the vehicle or application.

As seen in FIGS. 1 and 2, for this exemplary embodiment, web spokes 104 extend fully relative to the compliant band 102 across the axial direction A. Tension in web spokes 104 is, therefore, distributed across band 102 to support the load. By way of example, web spokes 104 may be formed of an elastomeric material having a tensile modulus of about 3 MPa to 1.2 GPa. Web spokes 104 may also be reinforced if desired.

For the exemplary embodiment of FIGS. 1 and 2, web spokes 104 are interconnected by radially inner mounting band 106, which encircles the hub 108 to mount wheel 100 to hub 108. As stated, depending on the construction materials and manufacturing process, hub 108, mounting band 106, annular band 102, and/or web spokes 104 may be molded as single unit. Alternatively, one or more of such components may be formed separately and then attached to each other through e.g., adhesives or molding. Additionally, other components may be included as well. For example, an interface band can be used to connect web spokes 104 at their radially outer ends, and then the interface band would be connected to shear band 102.

According to a further embodiment, web spokes 104 could be mechanically attached to hub 108, for example, by providing an enlarged portion on the inner end of each web spoke 104 that engages a slot or other complementary device in hub 108, or by attaching adjacent web spokes 104 to form a loop at a hook or bar formed in hub 108. Substantially purely tensile load support is obtained by having a web spoke 104 that has high effective stiffness in tension but very low stiffness in compression. To facilitate bending in a particular direction, web spokes 104 may be curved. Alternatively, web spokes 104 can be molded with a curvature and straightened by thermal shrinkage during cooling to provide a predisposition to bending in a particular direction.

Web spokes 104 should resist torsion between annular band 106 and hub 108, for example, when torque is applied to wheel 100. In addition, web spokes 104 should resist lateral deflection when, for example, turning or cornering. As will be understood, web spokes 104 that lie in the radial-axial plane, that is, are aligned with both the radial R and axial A directions, will have high resistance to axially directed forces, but, particularly if elongated in the radial direction R, may have relatively low resistance to torque in the circumferential direction C.

For certain vehicles and applications, for example, those producing relatively low torque, a web spoke package having relatively short spokes 104 aligned with radial direction R may be suitable. For applications where high torque is expected, one of the arrangements such as shown in FIGS. 5 through 8 of U.S. Pat. No. 7,013,939 may be more suitable. In the variations shown therein, orientations of web spokes are provided that include a force-resisting component in both the radial R and the circumferential C directions, thus adding resistance to torque, while retaining radial and lateral force-resisting components. The angle of orientation may be selected depending on the number of web spokes used and the spacing between adjacent web spokes. Other alternative arrangements may also be used.

It should be understood that the present invention is not limited to wheel 100 as shown in FIGS. 1 and 2 and, instead, a variety of configurations may be employed. For example, wheel 100 could be constructed with shear band 102 incorporated into a rubber layer such that e.g., sidewalls cover the axial outermost sides of the shear band 102.

FIG. 3 provides a cross-sectional view of an exemplary shear band 102 of the present invention as viewed along a meridian plane of wheel 100. FIG. 4 provides a closer cross-sectional view along the same meridian plane of tire 100. As shown, shear band 102 includes an annular shear layer 124 constructed from at least one elastomeric material. For example, shear layer 124 may be constructed from rubber or other elastomers, polyurethane, and thermoplastics of suitable modulus. Shear band 102 includes a plurality of discrete, annular reinforcing elements 120 that are disposed throughout shear layer 124. Reinforcing elements 120 are annular and, therefore, extend around the circumference of wheel 100 and are typically manufactured by wrapping in a spiral manner about the axis of rotation.

For the exemplary embodiment shown in the figures, reinforcement elements 120 are positioned along a plurality of axially-oriented rows 122. Stated alternatively, reinforcing elements 120 are positioned in an adjacent manner along rows 122 that extend along axial direction A. Rows 122 may be linear or arcuate along axial direction A. Along each row 122, reinforcement elements 120 are separated from each other by a predetermined distance 126 of a magnitude denoted by $S_A$ (FIG. 4). Between adjacent rows 122, reinforcement elements 120 are separated from each other by a predetermined distance 128 of a magnitude $S_R$.

In one exemplary embodiment, for predetermined distance 126, the magnitude of $S_A$ is in the range of 0.1 mm≤$S_A$≤1 mm. For example, $S_A$ may be 0.1 mm in one exemplary embodiment, or 0.5 mm in another exemplary embodiment. In another exemplary embodiment, for predetermined distance 128, the magnitude of $S_R$ is in the range of 0.1 mm≤$S_R$≤1 mm. For example, $S_R$ may be 0.2 mm in one exemplary embodiment.

As also shown for the exemplary embodiment in FIG. 4, adjacent rows 122 of reinforcing elements 120 are interlaced along the radial direction of shear band 102. As previously defined, reinforcement elements 120 are interlaced in that reinforcement elements 120 of adjacent, axially-oriented rows such as e.g., 122a, 122b, and 122c, are not aligned with each other along radial direction R. Instead, for example, the center CT of a reinforcement element 120 of one axially-oriented row such as e.g., row 122b is positioned substantially adjacent to, and substantially centered with, the spaces (126a and 126c) between a pair of reinforcement elements 120 in adjacent, axially-oriented rows 122a and 122c.

As such, none of the spaces 126a, 126b, or 126c between reinforcements 120 along any row 122 are adjacent, along radial direction R, with any other space 126a, 126b, or 126c. Instead, spaces 126 are always separated, along radial direction R, by at least one reinforcement element 120. As will be understood by one of skill in the art using the teachings disclosed herein, during tire manufacture a perfect positioning of the center CT of a reinforcement element 120 precisely with space 126 between a pair of reinforcement elements 120 in an adjacent, axially-oriented row may not be possible due to e.g., the movement of materials during the manufacturing process. As such, slight displacements of the reinforcing elements 120 of the shear band 102 can occur. In still other exemplary embodiments of the invention, reinforcement elements 120 may not be interlaced as defined herein.

Each reinforcement 120 has a length $r_L$, along axial direction A and a width $r_W$ along radial direction R. As shown, $r_L$ is greater than $r_W$. In one exemplary embodiment of wheel 100, the ratio of $r_L/r_W$ is in the range of 2≤$r_L/r_W$≤10. In another exemplary embodiment, the ratio of $r_W/S_R$ is in the range of 1≤$r_W/S_R$≤10. In another exemplary embodiment, the ratio $r_L/S_A$ is in the range of 3≤$r_L/S_A$≤50. By way of example, in another exemplary embodiment of the invention, $r_L$=4 mm, $r_W$=1 mm, $S_A$=0.5 mm, and $S_R$=0.2 mm. In a typical construction, there will be a distribution of these ratios (or the dimensions $r_L$, $r_W$, $S_A$, $S_R$) around the specified values based on the manufacturing process capability.

A shown in FIGS. 2, 3, and 4, reinforcing elements 120 have a rectangular cross-sectional shape as viewed along the meridian plane of wheel 100. Notably, for certain exemplary embodiments, the length $r_L$, may be aligned along axial direction A as shown in FIGS. 3 and 4.

FIG. 5 provides a partial, cross-sectional view of an exemplary reinforcing element 120 of the present invention as viewed along a meridian plane. As used herein, rectangular means that the sides of reinforcing element 120 form an angle θ where 85 degrees≤θ≤95 degrees. In addition, each corner 134 may have outside surfaces 136 and 138 forming an edge or a slight radius RA where the ratio RA/$r_W$≤0.5. Other configurations may be used as well.

A variety of materials may be used for the construction of reinforcement elements 120. For example, reinforcing elements 120 may include one or more relatively inextensible cords or other elements 130 embedded within a matrix material or resin 131. For example, reinforcing elements 120 may be constructed from metal wires, pultruded glass fiber reinforcement in a filler of various resins, plastics, epoxies, clay, fiber reinforced plastic, and other materials and constructions as common to composite materials.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic wheel defining axial, radial, and circumferential directions, the non-pneumatic wheel comprising:
   an annular shear layer constructed from at least one elastomeric material; and
   a plurality of discrete, annular reinforcing elements positioned along a plurality of axially-oriented rows within the annular shear layer, the reinforcing elements separated from one another by a predetermined distance ($S_R$) along the radial direction and a predetermined distance SA along the axial direction, the reinforcing elements having a substantially rectangular cross-section, and the reinforcing elements each having a length ($r_L$) aligned along the axial direction.

2. The non-pneumatic wheel of claim 1, wherein the predetermined distance ($S_A$) separating the reinforcing elements along the axial direction is in the range of 0.1 mm≤$S_A$≤1 mm.

3. The non-pneumatic wheel of claim 1, wherein the predetermined distance ($S_R$) separating the reinforcing elements along the radial direction is in the range of 0.1 mm≤$S_R/r_W$≤10.

4. The non-pneumatic wheel of claim 1, wherein each reinforcement element has a width ($r_W$) extending along the radial direction, and wherein the ratio $r_L/r_W$ is in the range of 2≤$r_L/r_W$≤10.

5. The non-pneumatic wheel of claim 4, wherein the ratio $r_W/S_R$ is in the range of 1≤$r_W/S_R$≤10.

6. The non-pneumatic wheel of claim 4, wherein the ratio of $r_L/S_A$ is in the range of 3≤$r_L/S_A$≤50.

7. The non-pneumatic wheel of claim 1, wherein the annular reinforcement elements comprise inextensible reinforcements.

8. The non-pneumatic wheel of claim 1, wherein the annular reinforcement elements comprise at least one of a pultruded glass fiber reinforcement in a matrix comprising a resin or a plastic material.

9. The non-pneumatic wheel of claim 1, further comprising a shear band including the shear layer.

10. The non-pneumatic wheel of claim 9, further comprising a tread layer positioned radially outward of the shear band.

11. The non-pneumatic wheel of claim 10, further comprising a plurality of web spokes positioned radially-inward of the shear band, the web spokes configured for transmitting tension upon application of a load to the non-pneumatic wheel.

12. The non-pneumatic wheel of claim 11, further comprising a hub, wherein the web spokes extend radially between the wheel hub and the shear band.

13. The non-pneumatic wheel of claim 12, wherein the shear band and tread layer are integrally formed.

14. The non-pneumatic wheel of claim 13, wherein the reinforcing elements are interlaced along the radial direction of the shear band.

15. The non-pneumatic wheel of claim 14, wherein the shear band and web spokes are integrally formed.

* * * * *